United States Patent [19]

Wollar

[11] Patent Number: 4,470,737
[45] Date of Patent: Sep. 11, 1984

[54] PLASTIC DRIVE FASTENER HAVING TENSION-ADJUSTMENT MEMBER

[75] Inventor: Burnell J. Wollar, Barrington, Ill.

[73] Assignee: Phillips Plastics Corporation, Phillips, Wis.

[21] Appl. No.: 343,423

[22] Filed: Jan. 28, 1982

[51] Int. Cl.³ .............................................. F16B 19/00
[52] U.S. Cl. ..................................... 411/508; 24/453
[58] Field of Search ............................. 411/508–510, 411/500, 548; 24/213 R, 213 B, 214, 453, 297

[56] References Cited

U.S. PATENT DOCUMENTS

| | | | |
|---|---|---|---|
| 2,909,957 | 10/1959 | Rapata | 411/508 |
| 3,093,027 | 6/1963 | Rapata | 411/508 |
| 3,413,690 | 12/1968 | Pearson et al. | 411/508 |
| 3,485,133 | 12/1969 | Rapata | 411/508 |
| 3,550,217 | 12/1970 | Collyer | 411/509 |
| 3,722,037 | 3/1973 | Jaeger | 411/508 X |
| 3,803,670 | 4/1974 | Johnson | 411/508 |
| 3,811,154 | 5/1974 | Lindeman et al. | 411/508 X |
| 4,122,583 | 10/1978 | Grittner et al. | 411/509 X |

FOREIGN PATENT DOCUMENTS

| | | | |
|---|---|---|---|
| 2921956 | 12/1980 | Fed. Rep. of Germany | 411/508 |
| 635315 | 3/1962 | Italy | 411/508 |
| 1364 | 1/1977 | Japan | 411/509 |

Primary Examiner—Gary L. Smith
Assistant Examiner—Lloyd A. Gall
Attorney, Agent, or Firm—James E. Nilles

[57] ABSTRACT

The invention relates to a one-piece plastic fastener that has a shank, an enlarged head on a rear end of the shank, and resiliently movable bifurcations at the front end of the shank, the medial portion of the shank being wider than each of its ends to provide a shoulder and being flexingly contractable widthwise so that the fastener enters aligned holes in workpieces to be joined with a snap action. The shank is bifurcated along its length, and the forwardly opening slot between its bifurcations or legs is partially bridged by a tension-adjustment member, formed integrally with the bifurcations along one side thereof and extending inwardly from the side of the slot for a predetermined distance. The member controls or determine the amount of force required to move the legs or bifurcations toward each other during insertion into or removal of the fastener from the hole in the workpiece. Thus, fasteners of the same size and shape can be designed to fit workpiece holes of the same diameter but having different force requirements merely by changing the length of the tension-adjustment member during manufacture of the fastener and without otherwise changing the size or configuration of the fastener.

3 Claims, 16 Drawing Figures

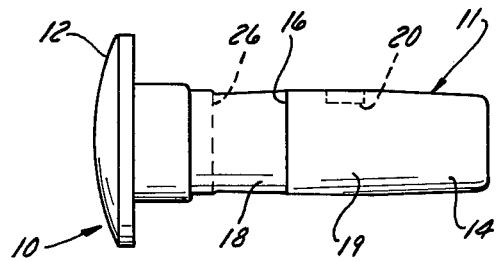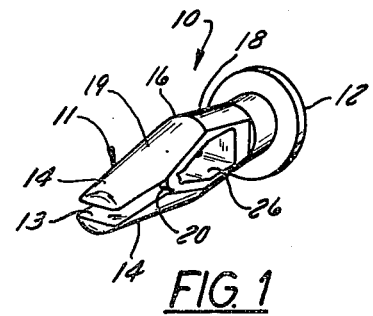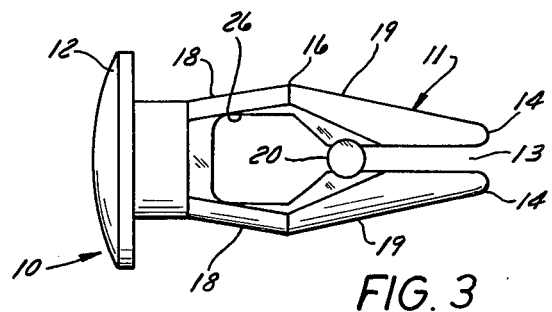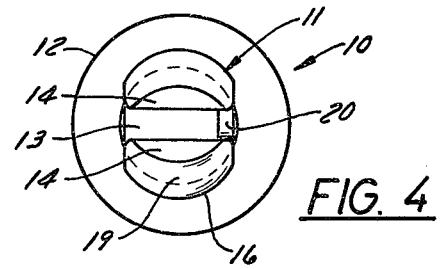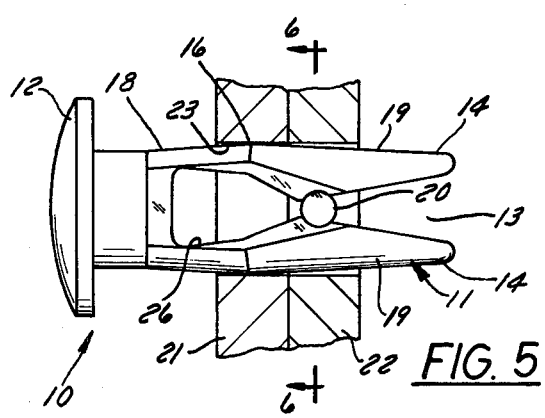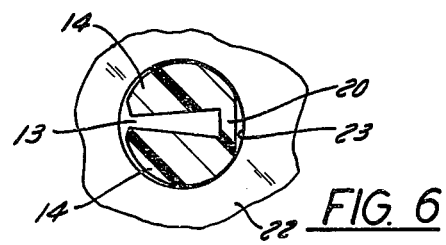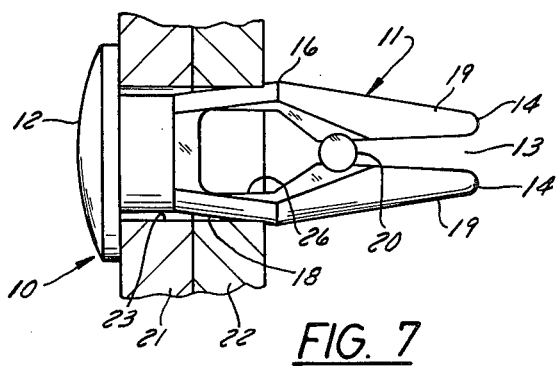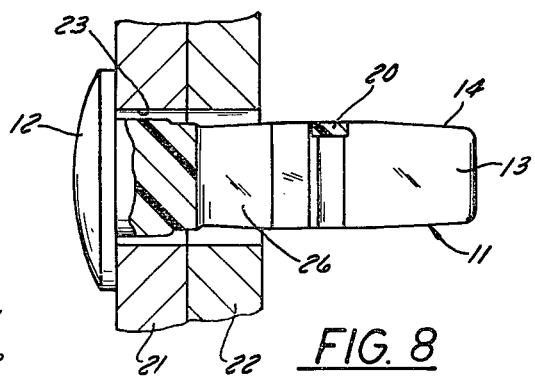

PLASTIC DRIVE FASTENER HAVING TENSION-ADJUSTMENT MEMBER

BACKGROUND OF THE INVENTION

1. Field of Use

This invention relates generally to a removable, reusable one-piece plastic drive fastener that is insertable in aligned holes in workpieces which are to be joined together.

In particular, it relates to such a drive fastener which comprises an elongated shank having a head at one (rear) end and having resiliently movable bifurcations or legs at the other (front) end, which bifurcations are wider intermediate the ends of the shank so as to define an exterior shoulder spaced from the head. In use, the bifurcations flex inward toward each other during fastener insertion to enable the shoulder to pass through the hole and then flex outward away from each other with a snap action when full insertion is accomplished.

2. Description of the Prior Art

Applicant's co-pending application Ser. No. 238,126 filed Feb. 25, 1981 for PLASTIC DRIVE FASTENER and assigned to the same Assignee as the present application discloses drive fasteners of the aforesaid general character and also refers to the following U.S. Patents as showing the state of the art: U.S. Pat. Nos. 3,093,027; 3,029,486; 2,983,008. Such prior art fasteners are so designed and constructed that a fastener of a specific diameter or size fits a workpiece hole of a specific diameter or range of diameters. However, fasteners of the same size very often are employed in different applications which impose special problems. For example, in cases where a human operator must manually insert many pins on each product, such as when attaching an insulating strip to a refrigerator door, it is essential that only a small amount of force be required to force the bifurcated legs together as the fastener is being inserted in order to prevent operator fatigue and discomfort. On the other hand, in some cases it is required that a fastener of the same size be harder to insert and remove in order to ensure a sound connection between the workpieces being joined. It is undesirable, however, for the fastener manufacturer to be required to maintain many different dies in order to provide fasteners of the same size but having different resiliency levels.

SUMMARY OF THE PRESENT INVENTION

In accordance with the present invention there is provided an improved removable reusable one-piece plastic drive fastener of the aforedescribed character which is provided with an integrally formed tension-adjustment member of a desired size, which requires a predetermined amount of force to cause the legs to move together as the fastener is being inserted in a workpiece hole.

In accordance with the present invention, a one-piece plastic fastener comprises, a shank having an enlarged head at one (rear) end of the shank, and resiliently movable bifurcations or legs at the other end of the shank, the medial portion of the shank being wider than each of its end portions and being flexingly contractable widthwise so that the fastener enters aligned holes in workpieces to be joined with a snap action. The shank is bifurcated along its length, and the forwardly opening slot between its bifurcations is bridged by a tension-adjustment member, formed integrally with the bifurcations along one side thereof and extending inwardly between the legs from the side of the slot for a predetermined distance, to limit or control the force required to cause the bifurcations to move toward each other during entry into the hole in the workpiece. Thus, since the length of the member, i.e., the distance it extends into the slot between the legs in a direction normal to the fastener's longitudinal axis, determines the amount of force required for inward flexing of the bifurcations, fasteners can be designed to fit workpiece holes of the same diameter but having different force requirements merely by changing the length of the tension-adjustment member during manufacture of the fastener and without changing the size or configuration of the fastener.

In practice, the fastener is fabricated in a mold or die (not shown) by an injection molding process. The length of the tension-adjustment member, i.e., the distance it extends inwardly between the legs or bifurcations, is determined during manufacture by how far an adjustably positionable cylindrical component (not shown) of the die is inserted into the die cavity (not shown) prior to injection into the die of the molten plastic of which the fastener is formed. The aforesaid die component (not shown) preferably takes the shape of a solid cylindrical member which is slidably movable axially in a cylindrical bore (not shown) in a portion of the die. Means (not shown) are provided to releasably lock the cylindrical component in any one of a plurality of axial positions.

Drive fasteners in accordance with the present invention offer several advantages over the prior art. For example, fasteners of the same general size and configuration are in fact tailored to require specific force levels before they can be inserted or removed from workpiece holes. Particular force requirements are achieved merely by a change in the length of the tension-adjustment member which is otherwise common to the fasteners of a given size. A single die or die assembly having a slidable component can be employed to manufacture fasteners having tension adjusting members of different lengths. Changing the position of the slidable component to produce different types of fasteners is easily and cheaply accomplished. Other objects and advantages of the invention will hereinafter appear.

DRAWINGS

FIG. 1 is a perspective view of a fastener in accordance with one embodiment of the present invention;

FIG. 2 is an enlarged side elevation view of the fastener of FIG. 1 as it is seen looking in the direction of the flexing of the bifurcations of its shank;

FIG. 3 is a side elevation of the fastener of FIGS. 1 and 2 but as it is seen looking in a direction normal to the direction from which it is seen in FIG. 2;

FIG. 4 is a view of the fastener as seen from its front end;

FIG. 5 is a view generally similar to FIG. 3 but showing the fastener in a condition when it is partway inserted into aligned holes in workpieces which are to be joined;

FIG. 6 is a sectional view taken on line 6—6 in FIG. 5;

FIG. 7 is a view generally similar to FIG. 5 but showing the fastener fully inserted in the holes;

FIG. 8 is a view similar to FIG. 7 but showing the fastener as it is seen looking in a direction normal to the direction from which it is seen in FIG. 7;

DESCRIPTION OF PREFERRED EMBODIMENTS

FIRST EMBODIMENT

Figure 10:
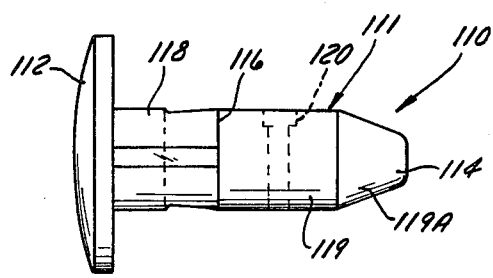
FIG. 10 is an enlarged side elevation view of the fastener of FIG. 9 as it is seen looking in the direction of the flexing of the bifurcations of its shank.
Figure 9:
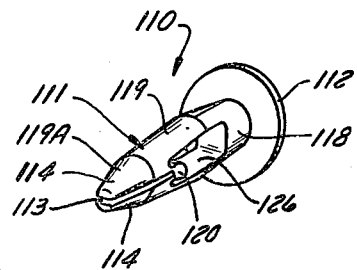
FIG. 9 is a perspective view of a fastener in accordance with another embodiment of the present invention.
Figure 11:
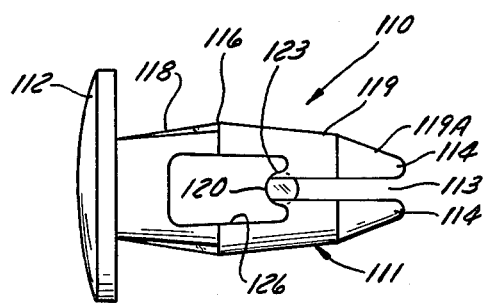
FIG. 11 is a side elevation of the fastener of FIGS. 9 and 10 but as it is seen looking in a direction normal to the direction from which it is seen in FIG. 10.
Figure 12:
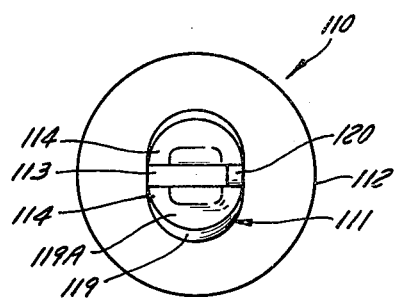
FIG. 12 is a view of the fastener as seen from its front end.

Referring to FIGS. 1 through 8, the numeral 10 designates a removable reusable one-piece plastic drive fastener having tension-adjustment means in accordance with a first embodiment of the present invention. Fastener 10 is molded in one piece, of a firm but resilient plastic material such as nylon or polyethylene. Fastener 10 has a forwardly bifurcated shank 11 that is receivable in a round hole and has a coaxial head 12 at the rear of its shank that can be in the form of a disc or button. The bifurcations 14 of the shank 11, which extend along a major portion of its length, are laterally spaced apart all along their lengths, and they are in symmetrical relation to the longitudinal axis of the fastener, at opposite sides of that axis.

When the fastener 10 is in relaxed condition, with the bifurcations 14 of its shank 11 unflexed (FIGS. 1, 2, 3, 4), the shank is widest in a medial zone 16 that is spaced from both its front and its rear ends. The maximum-width medial zone 16 of the shank 11 defines a shoulder that is spaced forwardly from the head 12. As here shown, the shank 11 has a gradual reduction in width directly behind its widest portion, so that its shoulder comprises a rearwardly facing slope 18 on each bifurcation. For a short distance forward from the shoulder 16 the shank has a rather gradual forward taper, as at 19.

Fastener 10 is provided with an integrally formed tension-adjustment member 20, which adapts fasteners such as 10, which are otherwise of the same configuration and size, to be subjected to different force requirements to accomplish flexing of the legs together when inserting or removing the fastener from a workpiece opening of a specific size.

The resiliently movable bifurcations 14 at the front end of the shank 11 are flexibly contractable widthwise in the region of shoulder 16 so that the fastener 10 enters aligned holes in workpieces to be joined with a snap action, as hereinafter explained. As stated, the shank 11 is bifurcated along its length, and the forwardly opening slot 13 between its bifurcations 14 is partially bridged by the tension-adjustment member 20, formed integrally with the bifurcations 14 along one side thereof and extending inwardly from the side of the slot 13 for a predetermined distance in a direction normal to the longitudinal axis of the fastener, to limit or control the force required to effect separation of the tips of the bifurcations and narrowing of the shoulder as the bifurcations 14 converge toward each other along a lateral edge (see FIG. 6) during entry into a hole 23 in the workpieces 21 and 22, as comparison of FIGS. 3, 4 and 5, 6 show. Thus, since the length of the member 20 determines the force required for inward flexing of the bifurcations 14 (i.e., the longer member 20, the greater the force required), fasteners 10 can be designed to fit workpiece holes of the same diameters but having different force requirements merely by changing the predetermined length of the tension-adjustment member during manufacture of the fastener and without otherwise changing the size or configuration of the fastener.

In practice, the length of the tension-adjustment member 20 is determined by how far an adjustable positionable component (not shown) of a die (not shown) is inserted into a die cavity (not shown) formed by the fastener die (not shown) prior to injection into the die (not shown) of the molten plastic of which the fastener 10 is formed. The aforesaid die component (not shown) preferably takes the shape of a solid cylindrical member which is slidably movable axially in a cylindrical bore (not shown) in another component (not shown) of the die. Means (not shown) are provided to releasably lock the cylindrical component (not shown) in any one of a plurality of axial positions during a molding operation.

As FIGS. 5 through 8 show, a workpiece in which the fastener 10 is received can comprise two members 21, 22, which can be panels, plates or sheets. At least one of the members 21, 22 will normally be rather stiff, and the other may be equally stiff or may be relatively soft and resilient, like a freezer door gasket or a sheet of foam insulating material. In any case the workpiece will have a hole 23 in which the shank 11 of the fastener is received and which is defined by registering bores in the members 21, 22. As FIGS. 7 and 8 show, when the fastener 10 is fully received in the hole 23, its shoulder 16 and its head 12 cooperate with the front and rear surfaces of the workpiece to confine the fastener against axial displacement relative to the workpiece.

As FIGS. 5 and 6 show, when the shank 11 is inserted forwardly into a hole 23, its tapering front portion 19 makes camming or wedging engagement with the edge of the hole 23 to converge its bifurcations 14, thus narrowing the widest portion 16 of the shank sufficiently to enable it to pass through the hole 23. The force required to accomplish this is determined by the member 20 (see FIG. 6). It is to be noted, however, that member 20 causes the bifurcations 14 to pivot thereabout and cause space 13 to widen slightly during insertion (compare FIGS. 3 and 5). As this shoulder 16 emerges forwardly from the hole, relieving or partially relieving the flexing bias upon the bifurcations 14, they spread apart in the region of shoulder 16 with a detent-like snap action so that the shoulder 16 is again wider than the hole 23 and resists withdrawal of the fastener from the workpiece. Note, however, that bifurcations 14 come together again (compare FIGS. 5 and 7).

As will be apparent, the rear portion 18 of the shank 11, directly behind the shoulder 16, will ordinarily be wide enough to fit the hole 23 under some compression, so that the bifurcations 14 will be forced to diverge slightly relative to their relaxed conditions (compare FIGS. 7 and 3), thus ensuring that the fastener 10 will maintain a firm, secure wedging relationship or connection with the workpiece.

When the fastener 10 is inserted into a hole, and as the bifurcations 14 of the shank are converged to narrow the shoulder 16, most of the flexing deformation of the bifurcations tends to occur near the rear of the shank, in the region 26 between head 12 and member 20, where leverage imposes the highest stresses upon the bifurcations.

Although herein shown and described as suitable for reception in a round hole 23 by reason of having rounded outer surfaces on its bifurcations 14, the fastener 10 of this invention could obviously be configured for reception in a square or rectangular hole (not shown) where such an installation is desired.

SECOND EMBODIMENT

Referring now to FIGS. 9 through 16, the numeral 110 designates a removable reusable one-piece plastic drive fastener having tension-adjustment means in accordance with a second embodiment of the present invention. Fastener 110 is molded in one piece, of a firm but resilient plastic material such as nylon or polyethylene. Fastener 110 has a forwardly bifurcated shank 111 that is receivable in a round hole and has a coaxial head 112 at the rear of its shank that can be in the form of a disc or button. The bifurcations 114 of the shank 111, which extend along a major portion of its length, are laterally spaced apart all along their lengths, and they are in symmetrical relation to the longitudinal axis of the fastener, at opposite sides of that axis.

Fastener 110 has a slot 113 between the bifurcations or legs 114 adjacent the underside of the shoulders 116 to allow for shoulder flexing. When the fastener 110 is in relaxed condition, with the bifurcations 114 of its shank 111 unflexed (FIGS. 9, 10, 11, 12), the shank is widest in a medial zone 116 that is spaced from both its front and its rear ends. The maximum-width medial zone 116 of the shank 111 defines a shoulder that is spaced forwardly from the head 112. As here shown, the shank 111 has a gradual reduction in width directly behind its widest portion, so that its shoulder comprises a rearwardly facing slope 118 on each bifurcation. For a short distance forward from the shoulder 116 the shank has a rather gradual forward taper, as at 119, and then a steeper taper as at 119A.

Fastener 110 is provided with an integrally formed tension-adjustment member 120, which adapts fasteners such as 110, which are otherwise of the same configuration and size, to fit an opening of a specific size but to require specific forces during insertion and removal. The member 120 is joined to the underside of each leg 114 by a relatively thin web of plastic as at 123 to enable substantial flexing of the legs 114 (compare FIGS. 11 and 13).

The resiliently movable bifurcations 114 at the front end of the shank 111 are flexibly contractable widthwise in the region of shoulder 116 so that the fastener 110 enters aligned holes in workpieces to be joined with a snap action, as hereinafter explained. As stated, the shank 111 is bifurcated along its length, and the forwardly opening slot 113 between its bifurcations 114 is partially bridged by the tension-adjustment member 120, formed integrally with the bifurcations 114 along one side thereof and extending inwardly from the side of the slot 113 for a predetermined distance, to limit or control the force required to move the bifurcations or legs 114 toward each other (see FIG. 14) during entry into a hole 23 in the workpieces 21 and 22, as comparison of FIGS. 11, 12 and 13, 14 show. Thus, since the length of the member 120 determines the force required for inward flexing of the bifurcations 114, fasteners 110 can be designed to fit workpiece holes of different diameters but having different force requirements merely by changing the predetermined length of the adjustment member during manufacture of the fastener and without otherwise changing the size or configuration of the fastener.

In practice, the length of the tension-adjustment member 120 is determined by how far an adjustably positionable component (not shown) of a die (not shown) is inserted into a die cavity (not shown) formed by the fastener die (not shown) prior to injection into the die (not shown) of the molten plastic of which the fastener 110 is formed. The aforesaid die component (not shown) preferably takes the shape of a solid cylindrical member which is slidably movable axially in a cylindrical bore (not shown) in another component (not shown) of the die. Means (not shown) are provided to releasably lock the cylindrical component (not shown) in any one of a plurality of axial positions during a molding operation.

Figure 13:
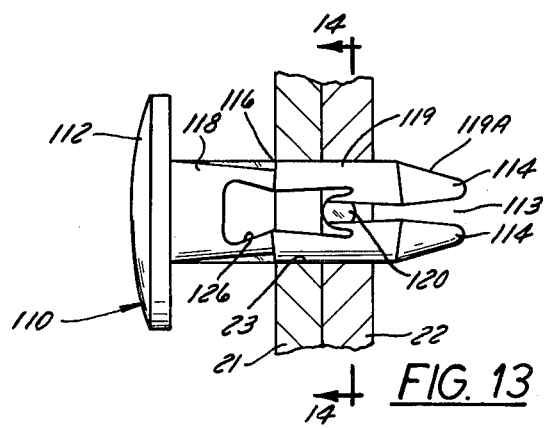
FIG. 13 is a view generally similar to FIG. 11 but showing the fastener in a condition when it is partway inserted into aligned holes in workpieces which are to be joined.
Figure 14:
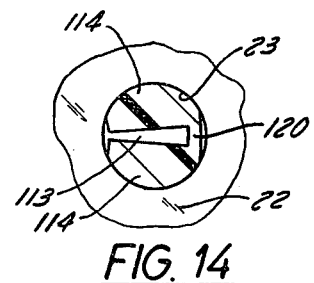
FIG. 14 is a sectional view taken on line 14—14 in FIG. 13.
Figure 16:
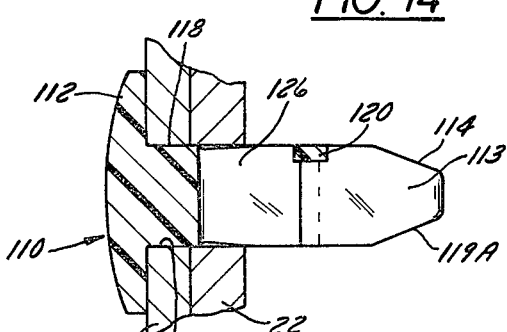
FIG. 16 is a view similar to FIG. 15 but showing the fastener as it is seen looking in a direction normal to the direction from which it is seen in FIG. 15.
Figure 15:
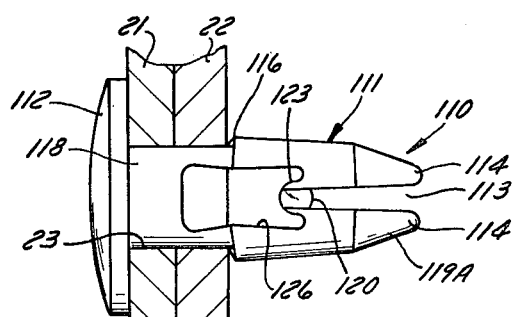
FIG. 15 is a view generally similar to FIG. 13 but showing the fastener fully inserted in the holes.

As FIGS. 13 through 16 show, a workpiece in which the fastener 110 is received can comprise two members 21, 22, which can be panels, plates or sheets. At least one of the members 21, 22 will normally be rather stiff, and the other may be equally stiff or may be relatively soft and resilient, like a freezer door gasket or a sheet of foam insulating material. In any case the workpiece will have a hole 23 in which the shank 111 of the fastener is received and which is defined by registering bores in the members 21, 22. As FIGS. 15 and 16 show, when the fastener 110 is fully received in the hole 23, its shoulder 116 and its head 112 cooperate with the front and rear surfaces of the workpiece to confine the fastener against axial displacement relative to the workpiece.

As FIGS. 13 and 14 show, when the shank 111 is inserted forwardly into a hole 23, its tapering front portion 119 makes camming or wedging engagement with the edge of the hole 23 to converge its bifurcations 114, thus narrowing the widest portion 116 of the shank sufficiently to enable it to pass through the hole 23. The force required to accomplish this is determined by the member 120 (see FIG. 14). It is to be noted, however, that member 120 causes the bifurcations 114 to pivot thereabout and cause space 113 to widen slightly during insertion (compare FIGS. 11 and 13). As this shoulder 116 emerges forwardly from the hole, relieving or partially relieving the flexing bias upon the bifurcations 114, they spread apart in the region of shoulder 116 with a detent-like snap action so that the shoulder 116 is again wider than the hole 23 and resists withdrawal of the fastener from the workpiece. Note, however, that bifurcations 114 come together again (compare FIGS. 13 and 15).

As will be apparent, the rear portion 118 of the shank 111, directly behind the shoulder 116, will ordinarily be wide enough to fit the hole 23 under some compression, so that the bifurcations 114 will be forced to diverge slightly relative to their relaxed conditions (compare FIGS. 15 and 11), thus ensuring that the fastener 110 will maintain a firm, secure wedging relationship or connection with the workpiece.

When the fastener 110 is inserted into a hole, and as the bifurcations 114 of the shank are converged to narrow the shoulder 116, most of the flexing deformation of the bifurcations tends to occur near the rear of the shank, in the region 126 between head 112 and member 120, where leverage imposes the highest stresses upon the bifurcations. Thus, it is preferred that the flexible webs 123 be provided.

Although herein shown and described as suitable for reception in a round hole 23 by reason of having rounded outer surfaces on its bifurcations 114, the fastener 110 of this invention could obviously be configured for reception in a square or rectangular hole (not shown) where such an installation is desired.

I claim:

1. A one-piece fastener comprising a bifurcated shank having a head at a rear end thereof and having forwardly projecting bifurcations defining a front end that are laterally spaced apart along the length of the shank and terminate in spaced apart tips, said shank having a medial portion which is wider than each of its ends and which defines a shoulder that can be narrowed by flexingly converging said bifurcations so that said shoulder can pass through a hole in a workpiece in which the shank is receivable, said head and said shoulder being cooperable with opposite surfaces of the workpiece to confine the fastener against axial displacement relative thereto, said fastener being characterized by:

a member integrally formed with said shank and bridging the space between said bifurcations near one side thereof and extending for a predetermined distance inwardly from one lateral edge of said bifurcations in a direction normal to the longitudinal axis of said fastener, said bifurcations flexing during pin insertion and removal from said hole in said workpiece to effect separation of said tips and narrowing of said shoulder as said bifurcations converge along their other lateral edge.

2. A fastener according to claim 1 wherein said member is connected to both bifurcations along its entire length.

3. A fastener according to claim 1 or 2 wherein said member is connected to both bifurcations by flexible means.

* * * * *